(12) United States Patent
Shea (10) Patent No.: US 7,035,068 B2
(45) Date of Patent: Apr. 25, 2006

(54) APPARATUS AND METHOD EMPLOYING AN OPTICAL FIBER FOR CLOSED-LOOP FEEDBACK DETECTION OF ARCING FAULTS

(75) Inventor: John J. Shea, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 317 days.

(21) Appl. No.: 10/729,525

(22) Filed: Dec. 5, 2003

(65) Prior Publication Data

US 2005/0122643 A1    Jun. 9, 2005

(51) Int. Cl.
*H02H 3/00*    (2006.01)
(52) U.S. Cl. .................. 361/42; 250/227.11
(58) Field of Classification Search ............. 361/42
See application file for complete search history.

(56) References Cited

U.S. PATENT DOCUMENTS

| | | | |
|---|---|---|---|
| 4,702,553 A * | 10/1987 | Buchmuller et al. | 385/12 |
| 5,650,902 A | 7/1997 | Herkenrath et al. | |
| 5,910,872 A | 6/1999 | Marmonier et al. | |
| 5,940,547 A | 8/1999 | Schumacher et al. | |
| 6,229,680 B1 | 5/2001 | Shea | |
| 6,236,548 B1 | 5/2001 | Marmonier | |
| 6,433,976 B1 * | 8/2002 | Phillips | 361/42 |
| 6,633,009 B1 | 10/2003 | Shea | |
| 6,657,150 B1 | 12/2003 | Shea et al. | |

FOREIGN PATENT DOCUMENTS

DE    196 01 639 A1    7/1997

OTHER PUBLICATIONS

Linear Technology Corporation, "Design Notes—100 MHz Op Amp Features Low Noise Rail-to-Rail Performance While Consuming Only 2.5 mA", Nov. 2003, 2 pp.

* cited by examiner

*Primary Examiner*—Phuong T. Vu
*Assistant Examiner*—Scott Bauer
(74) *Attorney, Agent, or Firm*—Martin J. Moran (57) ABSTRACT

An apparatus detects arcing faults at a first wavelength. A light source provides modulated light at a second different wavelength and a first frequency. An optical fiber receives the modulated light and gathers ambient light at both wavelengths. A splitter receives and splits the received light into first and second beams. A first filter extracts from the first beam a first filtered beam including the first wavelength. A first photodetector generates a first electrical signal from the first filtered beam. A second filter extracts from the second beam a second filtered beam excluding the first wavelength. A second photodetector generates a second electrical signal from the second filtered beam. A low pass filter extracts from the second electrical signal a third electrical signal representative of light at the second wavelength excluding the modulated light. A comparator generates an arcing signal when the first electrical signal exceeds the third electrical signal.

20 Claims, 6 Drawing Sheets

APPARATUS AND METHOD EMPLOYING AN OPTICAL FIBER FOR CLOSED-LOOP FEEDBACK DETECTION OF ARCING FAULTS

BACKGROUND OF THE INVENTION

1. Field of the Invention

The present invention relates to the detection of arcing faults at components of electric power systems and, more particularly, to detecting such faults within the metal cabinets of switchgear. More specifically, the invention relates to an apparatus and method for detecting arcing faults with optical fibers.

2. Background Information

Electric power systems incorporate switches for control and protection purposes. Distribution systems, which form part of the overall electric power system, include main and branch power buses and circuit breakers mounted in metal cabinets to form switchgear. Interruption of current flow in the buses of the distribution system by a circuit breaker creates an arc as the contacts of the circuit breaker open. These arcs caused by interruption are contained and extinguished in the normal course of operation of the circuit breaker.

At times, however, unintended arcing faults can occur within switchgear cabinets, such as between power buses, or between a power bus and a grounded metal component. Such arcing faults can produce high energy gases which pose a threat to the structure and nearby personnel. This is especially true when maintenance is performed on or about live power circuits. Frequently, a worker inadvertently shorts out the power bus, thereby creating an arcing fault inside the enclosure. The resulting arc blast creates an extreme hazard and could cause injury or even death. This problem is exacerbated by the fact that the enclosure doors are typically open for maintenance.

A common approach to protecting personnel from arcing faults in switchgear has been to design the metal enclosures to withstand the blast from the arcing fault. This has been done at great additional costs due to the heavy gauge metal used and numerous weld joints needed to prevent flying debris. Even with these precautions, the blast from an arcing fault inside the switchgear cannot be contained.

Recently, methods have been developed to minimize the severity of the blast from an internal arcing fault. These methods include pressure sensing and light detection, which sense the arcing fault within the switchgear and cause a circuit breaker to trip before significant damage can result. The pressure sensing method is limited by the insensitivity of the pressure sensors. By the time cabinet pressure has risen to detectable levels, the arcing fault has already caused significant damage.

The light from the arcing fault contains wavelengths characteristic of the material creating the arc. Commonly, the arcing fault occurs at a power bus or disconnect, which are typically made of copper. Copper has a strong line emission wavelength at about 520 nm (e.g., 520.820 nm). In some applications, the power buses are coated with silver, which also has a strong line emission characteristic wavelength of about 520 nm (e.g., 521.908 nm) and another at about 546 nm (e.g., 546.550 nm). Unfortunately, other light sources (e.g., ambient light; tungsten bulb light; flashlight; fluorescent light; flash bulb light), which can be present, have a broadband continuum of wavelengths, which includes 520 nm and 546 nm. Thus, merely detecting light at about 520 nm will not distinguish an arcing fault from these other sources.

U.S. Pat. No. 6,229,680 discloses the detection of an arcing fault by gathering light from components susceptible to arcing faults and splitting this light into two beams. Light within a narrow band of wavelengths, which includes a wavelength characteristic of arcing from the material of the component, is extracted from the first beam by a first narrow beam sense filter (e.g., 520 nm to detect the characteristic emission lines of copper and silver). Light from a second narrow band of wavelengths, not including the characteristic wavelength for the arcing fault, is extracted from the second beam by a second narrow band background filter (e.g., 610 nm). Preferably, the second band of wavelengths is selected to have a wavelength range that has a greater intensity of the background light passed by the second or background filter than by the first or sense filter. Hence, in the absence of an arcing fault, the light passed by the background filter will be greater than that passed by the sense filter. However, when an arcing fault is present and light is generated by the arcing fault at the characteristic wavelength of the arcing material, the output of the sense filter will exceed that of the background filter and can be used as the indication that an arcing fault is present.

U.S. Pat. No. 5,650,902 discloses a device to detect an arcing fault in the bus bar compartment of a low voltage substation. The device includes an optical fiber conductor with a colored acrylate jacket, an electronic circuit with a light-emitting diode, which emits a constant light beam of a defined wavelength at the beginning of the optical fiber conductor, and a receiver on the end of the optical fiber conductor. This light beam is used to monitor protective equipment. If an arcing fault develops in the bus bar compartment, then the light from the fault is injected into, or interferes with, the optical fiber conductor through its jacket. The electronic circuit generates a voltage, which is proportional to the level of light. This additional light essentially raises the level of light received by an evaluation circuit. After a specified make-and-break level (e.g., as set by the evaluation circuit) is exceeded, a signal is generated for use by a selective protective device to deactivate the portion of the substation in which the arcing fault is occurring, or another suitable device. See, also, U.S. Pat. No. 5,940,547.

U.S. Pat. No. 5,650,902 also discloses that the optical fiber conductor is oriented perpendicular to bus bars and is wound therearound, without touching them. The optical fiber conductor is wound around each bus bar several times, either over the entire length of the bus bar or over major portions of it. Although there is an increased danger that the optical fiber conductor may be destroyed, the destruction will occur after the fault has been detected. Alternatively, the optical fiber conductor is arranged in a meandering fashion in front of, behind or parallel to bus bars at an approximately uniform distance; wound around connecting bars of field bus bars; and wound between current taps in an area where arcing faults will most probably occur.

It is known to employ a high-speed shorting switch, placed between a power bus and ground, or from bus to bus, in order to limit or prevent equipment damage and personnel injury due to arc blasts. It is also known to employ various types of crowbar switches for this purpose. The switches short the line voltage on the power bus, eliminating the arcing fault and preventing damage. The resulting short on the power bus causes an upstream circuit breaker to clear the fault. See, for example, U.S. Pat. No. 6,633,009.

Figure 1:
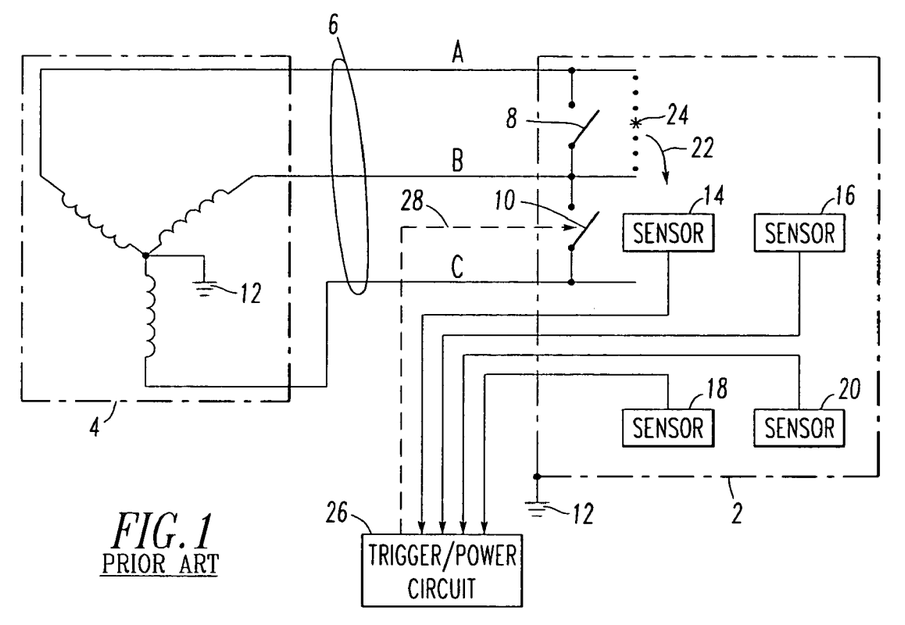
FIG. 1 is a block diagram of an arcing fault light sensor configuration for switchgear.

Such shorting switches, or other known shorting switches, may be applied in low voltage (e.g., up to about 690 VAC) and/or medium voltage (e.g., about 1 kV to about 38 kV) applications. For example, FIG. 1 shows medium voltage (e.g., 15 kV/60 MVA with a 50 kA fault potential) switchgear 2 for a three-phase power source 4. Associated with a three-phase power bus 6 is a first shorting switch 8, which is disposed between phases A and B, and a second shorting switch 10, which is disposed between phases B and C. Although the three-phase switchgear 2 and power source 4 are shown, one of the shorting switches 8,10 may be applied in a single-phase application. Although phase-to-phase shorting switches 8,10 are shown, such shorting switches may be applied from phase to ground 12. Disposed within the switchgear 2 are a plurality of light sensors 14,16,18,20, which detect the presence of arc light 22 associated with an arcing fault 24. In response to the arcing fault 24, one or more of the sensors 14,16,18,20 detect and communicate the presence of the arc light 22 to a trigger/power circuit 26, which responsively sends an actuation signal 28 to one or both of the shorting switches 8,10.

There is a need, therefore, for improved apparatus and method for detecting arcing faults in electric power systems and, particularly, within switchgear.

There is room for improvement in apparatus and method for detecting arcing faults.

There is also room for improvement in apparatus and method for protecting an electric power system bus from arcing faults.

SUMMARY OF THE INVENTION

These needs and others are met by the present invention, which employs optical feedback to monitor both light source modulated light and gathered light. This permits monitoring of the integrity and proper connection of an arcing fault light sensor.

As one aspect of the invention, an apparatus detects an arcing fault at a component of an electric power system in which the arcing fault generates light at a first predetermined wavelength in the presence of light at a second different wavelength from another source which may include the first predetermined wavelength. The apparatus comprises: a light source providing modulated light at the second wavelength and at a first frequency; an optical fiber including a first end, a gathering portion and a second end, the first end of the optical fiber receiving the modulated light from the light source, the gathering portion being proximate the component and receiving gathered light including some of the light at a first predetermined wavelength and some of the light at a second wavelength from another source, the second end of the optical fiber including the modulated light and the gathered light; a splitter receiving the modulated light and the gathered light from the second end of the optical fiber and splitting the modulated light and the gathered light into a first light beam and a second light beam; a first filter extracting from the first light beam a first filtered light beam including a first wavelength bandwidth having the first predetermined wavelength; a first detector generating a first sensed light electrical signal from the first filtered light beam; a second filter extracting from the second light beam a second filtered light beam including a second wavelength bandwidth not having the first predetermined wavelength; a second detector generating a second sensed light electrical signal from the second filtered light beam; a third filter extracting from the second sensed light electrical signal a third electrical signal representative of the some of the light at a second wavelength from another source and not including the modulated light; and means for generating an arcing signal in response to a predetermined relationship between the first sensed light electrical signal and the third electrical signal.

The means for generating an arcing signal may include a fourth filter and a threshold detector. The fourth filter may extract from the second sensed light electrical signal a fourth electrical signal representative of the modulated light. The threshold detector may generate an error signal in response to the fourth electrical signal being below a predetermined threshold value.

The component of an electric power system may be a switchgear bus bar. The optical fiber may be a plastic optical fiber including an outer jacket, an inner fiber, a first connector at the first end, an opening in the outer jacket at the gathering portion and a second connector at the second end. The first connector may engage the light source and receive the modulated light therefrom. The opening in the outer jacket at the gathering portion may be proximate the switchgear bus bar. The second connector may engage the splitter and transmit the modulated light and the gathered light thereto.

The component of an electric power system may include an enclosure housing a switchgear bus bar. The enclosure may include a surface facing the switchgear bus bar. The optical fiber may include an outer jacket, an inner fiber and an opening in the outer jacket at the gathering portion. The optical fiber at the gathering portion may be formed as a spiral and may be fastened to the surface of the enclosure. The opening in the outer jacket at the gathering portion may be opposite the surface and proximate the switchgear bus bar to receive the some of the light at a first predetermined wavelength and the some of the light from another source. This allows for distributing light sensing over a relatively large surface area. This reduces the potential for shielding, blocking or covering the sensing areas.

As another aspect of the invention, a method detects an arcing fault at a component of an electric power system in which the arcing fault generates light at a first predetermined wavelength in the presence of light at a second different wavelength from another source which may include the first predetermined wavelength. The method comprises: providing modulated light at the second wavelength and at a first frequency; employing an optical fiber including a first end, a gathering portion and a second end; receiving the modulated light at the first end of the optical fiber; disposing the gathering portion of the optical fiber proximate the component to receive gathered light including some of the light at a first predetermined wavelength and some of the light at a second wavelength from another source; receiving the modulated light and the gathered light from the second end of the optical fiber and splitting the modulated light and the gathered light into a first light beam and a second light beam; extracting from the first light beam a first filtered light beam including a first wavelength bandwidth having the first predetermined wavelength; generating a first sensed light electrical signal from the first filtered light beam; extracting from the second light beam a second filtered light beam including a second wavelength bandwidth not having the first predetermined wavelength; generating a second sensed light electrical signal from the second filtered light beam; extracting from the second sensed light electrical signal a third electrical signal representative of the some of the light at the second wavelength from another source and not including the modulated light; and generating an arcing signal in response to a predetermined relationship between the first sensed light electrical signal and the third electrical signal.

The method may comprise employing a low pass filter having a first turn-over frequency, which is less than the first frequency, to extract from the second sensed light electrical signal the third electrical signal representative of the some of the light at the second wavelength from another source and not including the modulated light at the first frequency; and employing a high pass filter having a second turnover frequency, which is greater than the first turn-over frequency and which is less than the first frequency, to extract from the second sensed light electrical signal the fourth electrical signal representative of the modulated light at the first frequency.

As another aspect of the invention, an apparatus protects a bus of an electric power system from an arcing fault, which generates light at a first predetermined wavelength in the presence of light at a second different wavelength from another source which may include the first predetermined wavelength. The apparatus comprises: a light source providing modulated light at the second wavelength and at a first frequency; an optical fiber including a first end, a gathering portion and a second end, the first end of the optical fiber receiving the modulated light from the light source, the gathering portion being proximate the component and receiving gathered light including some of the light at a first predetermined wavelength and some of the light at a second wavelength from another source, the second end of the optical fiber including the modulated light and the gathered light; a splitter receiving the modulated light and the gathered light from the second end of the optical fiber and splitting the modulated light and the gathered light into a first light beam and a second light beam; a first filter extracting from the first light beam a first filtered light beam including a first wavelength bandwidth having the first predetermined wavelength; a first detector generating a first sensed light electrical signal from the first filtered light beam; a second filter extracting from the second light beam a second filtered light beam including a second wavelength bandwidth not having the first predetermined wavelength; a second detector generating a second sensed light electrical signal from the second filtered light beam; a third filter extracting from the second sensed light electrical signal a third electrical signal representative of the some of the light at a second wavelength from another source and not including the modulated light; means for generating an arcing signal in response to a predetermined relationship between the first sensed light electrical signal and the third electrical signal; and means for removing power from the bus in response to the arcing signal.

The means for removing power from the bus in response to the arcing signal may include a shorting switch, which faults the bus in response to the arcing signal, and an upstream circuit breaker, which removes power from the bus in response to detection of overcurrent in the faulted bus.

The shorting switch may include a shorting member and a control circuit, which inputs the arcing signal and the error signal. The control circuit may actuate the shorting member when the arcing signal is true and when the error signal is false.

The optical fiber may include an outer jacket, an inner fiber, a first connector at the first end, an opening in the outer jacket at the gathering portion and a second connector at the second end. The first connector may engage the light source and receive the modulated light therefrom. The opening in the outer jacket at the gathering portion may be proximate the bus. The second connector may engage the splitter and transmit the modulated light and the gathered light thereto.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 2:
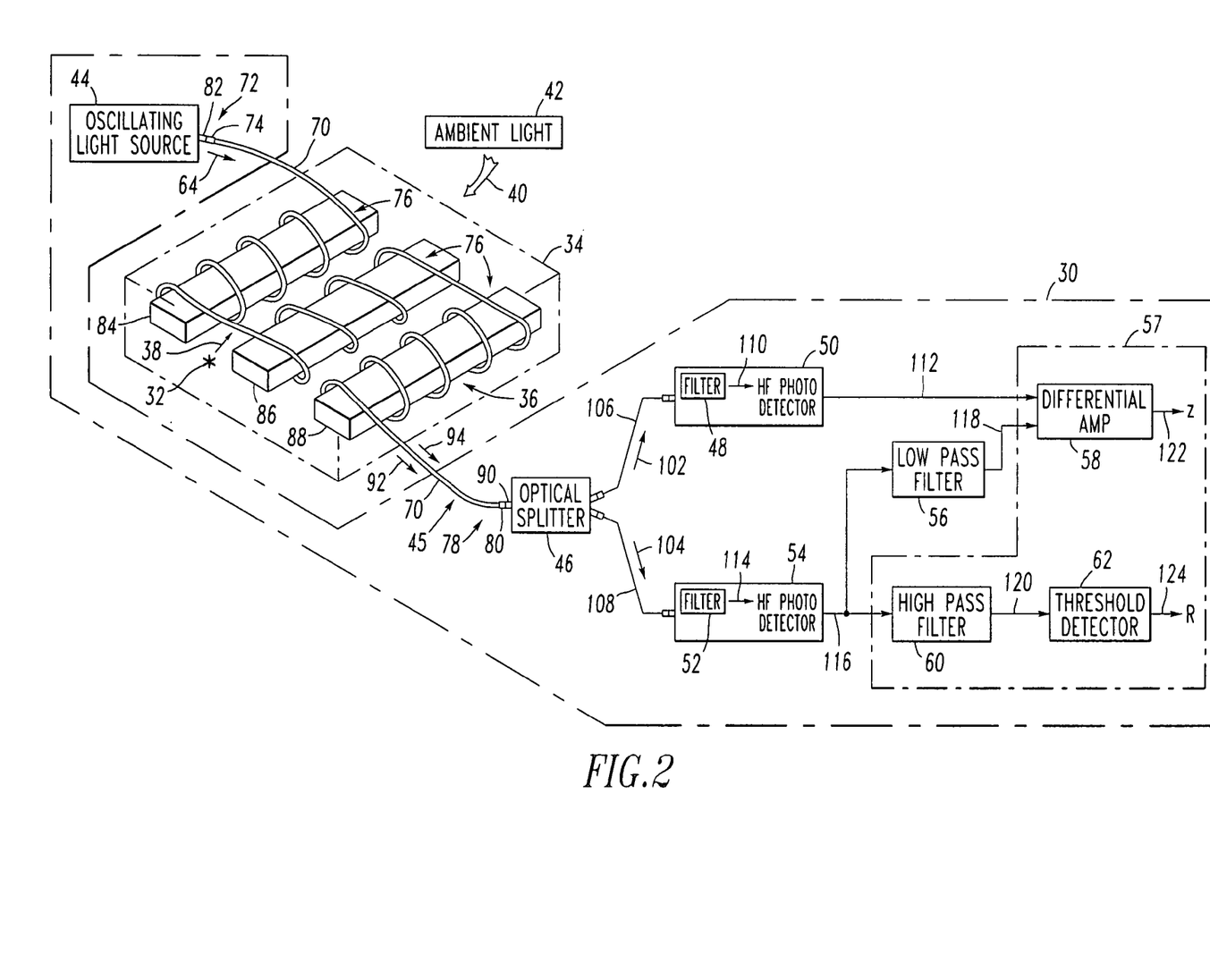
FIG. 2 is a block diagram of an arcing fault light sensor employing closed loop feedback in accordance with the present invention.
Figure 6:
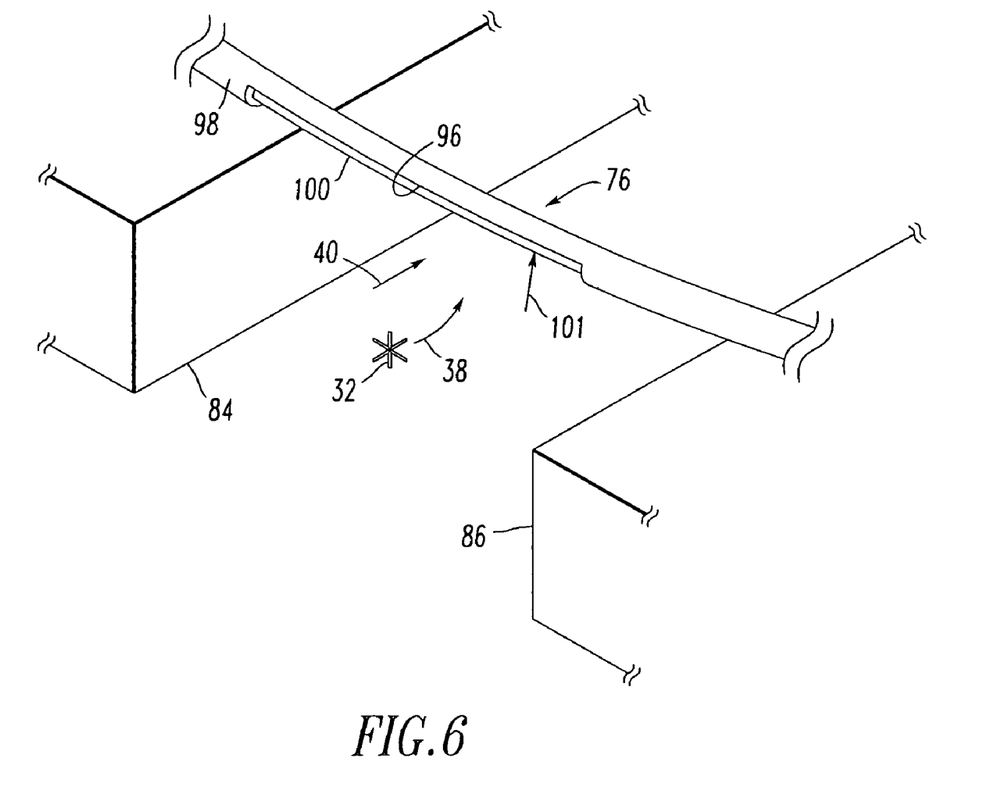
FIG. 6 is an isometric view of a portion of the light sensor of FIG. 2.

Referring to FIGS. 2 and 6, an arcing fault light sensor 30 detects an arcing fault 32 at an electric power system component, such as switchgear 34 including a three-phase power bus 36. Although three-phase switchgear 34 is disclosed, the invention is applicable to a wide range of electric power system components (e.g., low voltage systems (e.g., motor circuit protectors, load panels, bus runs); medium voltage fuse panels; single phase systems; capacitor banks; navy ship board applications) that are susceptible to arcing faults.

As is typical, the arcing fault 32 generates arc light 38 at a first predetermined wavelength (e.g., about 520 nm, in this example) in the presence of light 40 at one or more second different wavelengths (e.g., about 820 nm, in this example) from another source, such as ambient light 42. Although ambient light 42 is shown, the light 40 may originate from a wide range of sources (e.g., tungsten bulb light; flashlight; fluorescent light; flash bulb light; sun light) and may also include the first predetermined wavelength and well as other light wavelengths.

The light sensor 30 includes a light source 44, a plastic optical fiber (POF) assembly 45, an optical splitter 46, a first optical filter (e.g., 520 nm) 48, a first high frequency (HF) photodetector 50, a second optical filter (e.g., 820 nm) 52, a second high frequency (HF) photodetector 54, a low pass filter 56, and a circuit 57 including a differential amplifier 58, a high pass filter 60 and a threshold detector 62.

Figure 3A:
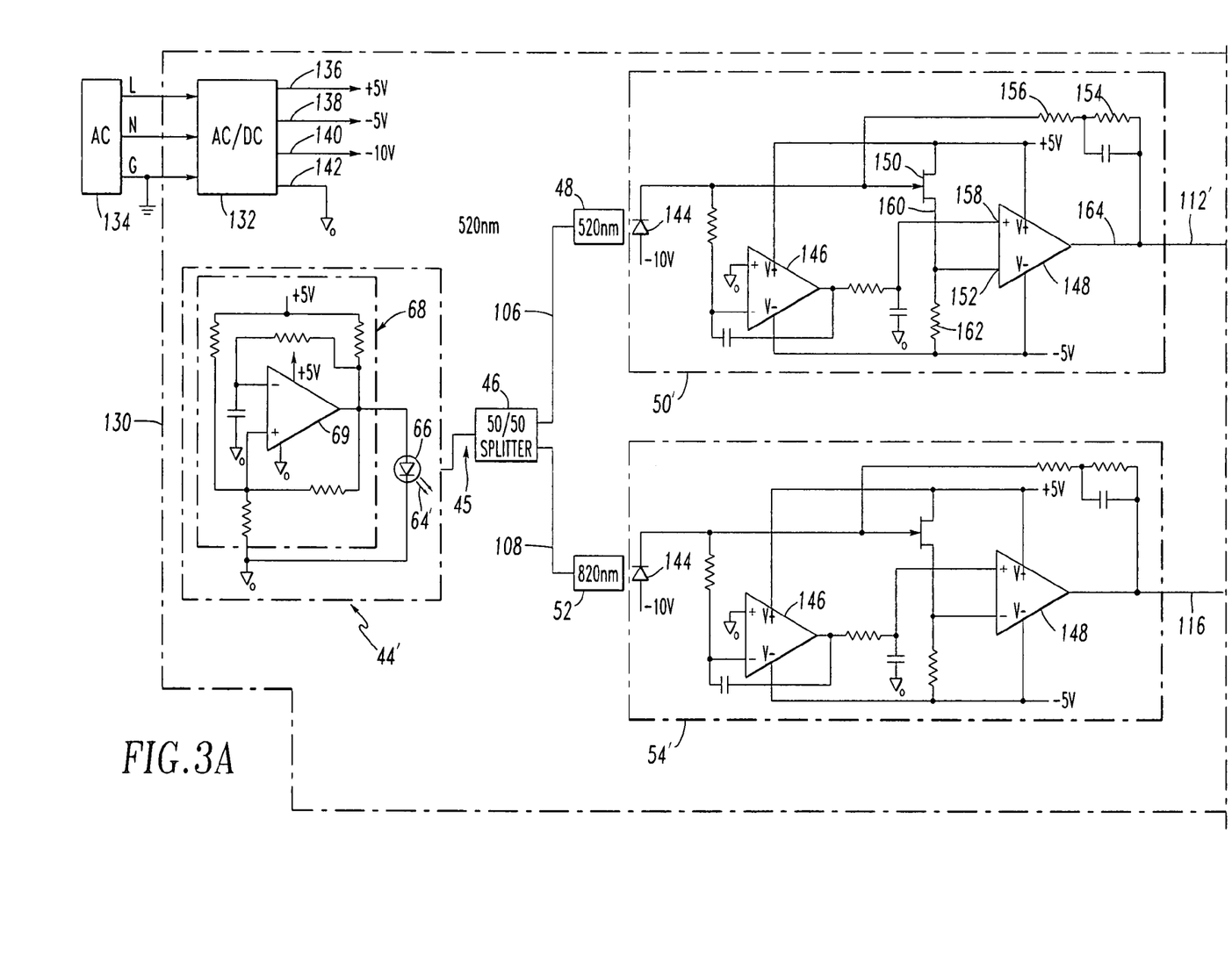
FIGS. 3A and 3B form a block diagram in schematic form of an arcing fault light sensor employing closed loop feedback in accordance with an embodiment of the present invention.

The light source 44 provides modulated light 64 to the POF assembly 45 at a suitable wavelength (e.g., 820 nm) and at a suitable frequency (e.g., 2 MHz). For example, as shown in FIG. 3A, the light source 44' includes an 820 nm LED 66, which is driven on and off at about a 50% duty cycle, at about a 2 MHz rate by a suitable oscillator 68 formed by comparator 69. The modulated light 64, which is employed for feedback monitoring, prevents a false monitoring signal resulting from background (ambient) light.

The POF assembly 45 includes a POF optical fiber cable 70 having a first end 72 with a first optical connector 74, one or more gathering portions 76, and a second end 78 with a second optical connector 80. The first optical connector 74 engages a corresponding optical connector 82 of the light source 44 and receives the modulated light 64 therefrom. The gathering portions 76 are proximate the three-phase power buses 84,86,88 of the switchgear power bus 36 and gather light including some of the arc light 38 and some of the ambient light 40. The second optical connector 80 engages a corresponding optical connector 90 of the optical splitter 46 and transmits modulated light 92 (i.e., feedback light, which is the light source modulated light 64) and gathered light 94 (i.e., the gathered portions of the arc light 38 and the ambient light 40) thereto. As shown in FIG. 6, the gathering portions 76 of the POF optical fiber cable 70 of FIG. 2 are formed by openings, such as 96, of the outer cable jacket 98, which openings expose the bare inner fiber 100 therein. In turn, the bare fiber 100 receives a portion of incident light 101, such as portions of the ambient light 40 and the arc light 38. Although the example opening 96 is shown with a portion of the jacket 98 being removed, other applications may remove the entire jacket (e.g., exposing the fiber 100 from all angles) (not shown) in certain areas of expected or actual arcing faults.

The optical splitter 46, such as a 50/50 optical splitter, receives the modulated light 92 and the gathered light 94 from the second end 78 of the POF optical fiber cable 70 and splits this combined light into a first light beam 102 and a second light beam 104, which beams have essentially the same light signal at about the same light intensity. The light beams 102 and 104 are communicated to the optical filters 48 and 52 by conventional fiber optic cable assemblies 106 and 108, respectively.

The 520 nm optical filter 48 extracts from the first light beam 102 a first filtered light beam 110 including a wavelength bandwidth having the predetermined wavelength, about 520 nm, of the arc light 38. That filtered light beam 110, which includes about 520 nm components of both the ambient light 40 and the arc light 38, is received by the first photodetector 50. The photodetector 50, in turn, generates a first sensed light electrical signal 112 from the filtered light beam 110.

In a like manner, the 820 nm optical filter 52 extracts from the second light beam 104 a second filtered light beam 114 including a wavelength bandwidth having the predetermined wavelength, about 820 nm, of the ambient light 40. That filtered light beam 114, which includes about 820 nm components of both the ambient light 40 and the source modulated light 64, is received by the second photodetector 54. The photodetector 54, in turn, generates a second sensed light electrical signal 116 from the filtered light beam 114.

The low pass filter 56 has a turn-over frequency (e.g., $f_o$=about 100 kHz), which is significantly less than the frequency of the light source 44, and extracts from the second sensed light electrical signal 116 a third electrical signal 118 representative of the gathered light 94 at about 820 nm, which excludes the modulated light 92 at 2 MHz. The low pass filter 56 significantly rejects the frequency of the modulated light 92 from the light source 44, while the optical filter 52 significantly rejects the predetermined 520 nm wavelength of the arc light 38. Hence, the signal 118 represents the gathered light 94 at about 820 nm, which is essentially from the ambient light 40.

The high pass filter 60 has a turn-over frequency (e.g., $f_o$=about 1.7 MHz), which is suitably less than the frequency of the light source 44, and which is significantly greater than the turn-over frequency of the low pass filter 56. This filter 60 extracts from the second sensed light electrical signal 116 a fourth electrical signal 120 representative of the modulated light 92 at about 820 mn and at about 2 MHz, which excludes the gathered light 94 at about 520 nm. The high pass filter 60 significantly rejects generally DC and other relatively low frequency ambient light 40, while the optical filter 52 significantly rejects the predetermined 520 nm wavelength of the arc light 38. Hence, the signal 120 represents the modulated light 92 at about 820 nm and about 2 MHz, which essentially is from the light source 44 and excludes the arc light 38.

A suitable circuit, such as the differential amplifier 58, generates an arcing detection signal, z, 122 in response to a predetermined relationship between the first sensed light (520 nm gathered light from arcing and ambient or other background sources) electrical signal 112 and the third electrical signal (820 nm gathered light from essentially ambient or other background sources) 118. For example, the differential amplifier 58 may compare these signals 112,118 and if the signal 112 is significantly greater (e.g., by at least a suitable predetermined amount; a sufficient amount in order to avoid nuisance activation of the detection signal 122) than the signal 118, then the detection signal 122 is set true, in order to, for example, activate an arc elimination device (e.g., a phase to ground or phase to phase shorting switch) (not shown); shorting switch 222 of FIG. 4).

In accordance with an important aspect of this embodiment, the light source 44, fiber optic cable assembly 45, optical splitter 46, optical filter 52, HF photodetector 54, high pass filter 60 and threshold detector 62 cooperate to provide closed loop feedback of the health of the arcing fault light sensor 30, as provided, in part, by the fiber optic cable 70. The threshold detector 62 generates an error signal, R, 124 in response to the fourth electrical signal 120 being below a predetermined threshold value (e.g., a suitable value to detect that the fiber 70 is broken; that the light source 44 is dark; that another component has failed). This signal 124 indicates that the fiber 70 is, most likely, broken. Hence, the use of the signal 122 is, preferably, disabled.

For the switchgear 34, the gathering portions 76 of the optical fiber 70 are preferably located proximate areas (e.g., without limitation, circuit breaker; circuit breaker compartment; main bus compartment; cable compartment; power bus bars) of potential arcing faults (e.g., areas of relatively close proximity between a power bus and a ground, or between a power bus and a different power bus) or areas that have been identified from reports of actual arcing faults. For example, the gathering portions 76 of the optical fiber 70 may be proximate such areas and may be: (1) oriented perpendicular to the bus bars 84,86,88 and wound therearound, preferably without touching them; (2) wound around each of such bus bars several times, either over the entire length of the bus bar or over major portions of it; (3) arranged in a meandering fashion in front of, behind or parallel to such bus bars at an approximately uniform distance; (4) wound around connecting bars (not shown) of field bus bars; and/or (5) wound perpendicular to the bus bars in a cable compartment (not shown) in an area where arcing faults will most probably occur.

Although 520 and 820 nm wavelengths are disclosed, a wide range of wavelengths may be employed for a wide range of arcing faults and ambient conditions.

Although example 100 kHz, 1.7 MHz and 2.0 MHz frequencies are disclosed, a wide range of suitable frequencies may be employed.

Figure 3B:
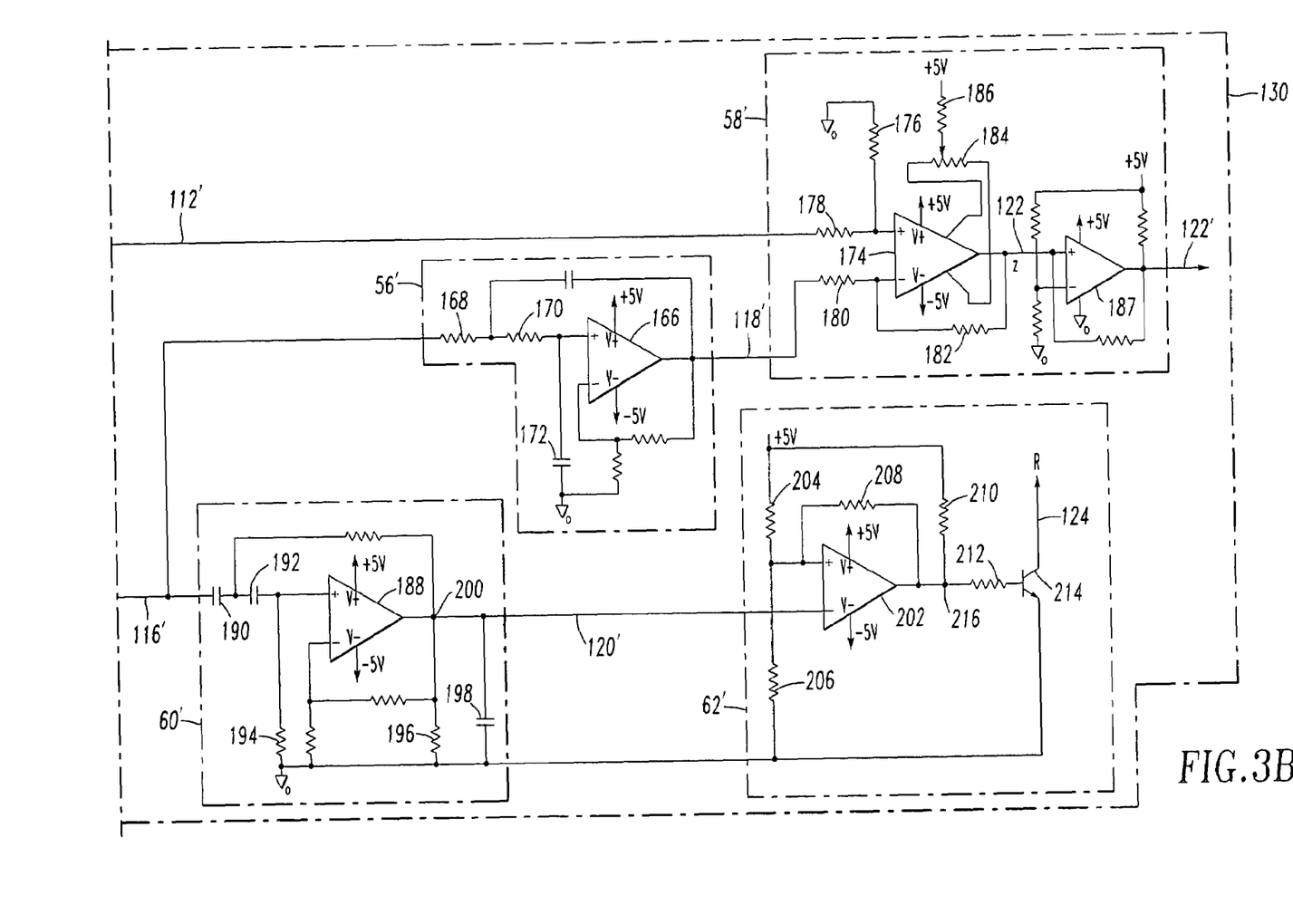

FIGS. 3A and 3B show an arcing fault light sensor 130, which functions in a similar manner as the arcing fault light sensor 30 of FIG. 2. The sensor 130 includes an AC/DC converter 132, which is powered from an external AC source 134, and which outputs various suitable DC voltages 136, 138,140 and ground 142 to various components of the sensor 130. Although example voltage levels are shown, a wide range of suitable voltage levels may be employed. The sensor 130 includes the light source 44', which sources modulated light 64' at about 820 nm from the LED 66 as suitably modulated on and off by the oscillator 68 at about a 50% duty cycle, at about a 2 MHz rate. The sensor 130 also includes the POF assembly 45, optical splitter 46, conventional fiber optic cables 106,108 and optical filters 48,52, as discussed above in connection with FIG. 2.

The sensor 130 further includes identical first and second HF photodetectors 50',54', which convert the filtered light from the optical filters 48,52 to output electrical signals 112',116', respectively. The HF photo detector 50' includes an input photodiode 144, a first op amp 146, an output op amp 148 and a relatively low noise discrete JFET 150. The JFET 150 acts as a source follower, which buffers the inverting input 152 of the output op amp 148 and makes it suitable for use with high impedance feedback resistors 154,156. For example, with the output op amp non-inverting input 158 at ground, the op amp 148 forces the JFET source 160 to ground, with resistor 162 ensuring that the JFET 150 has a suitable drain current (e.g., about 1 mA). Hence, this circuit self biases just below ground, typically at about −0.5 VDC. With no photocurrent signal in the photodiode 144, which is biased to the −10 V output 140, the op amp output 164 sits at the same voltage and tracks it. Otherwise, when the photodiode 144 is illuminated, the current comes from the op amp output 164 and through the resistors 154,156, in order that the op amp output 164 goes up in the manner of a conventional transimpedance amplifier. The first op amp 146 suitably restores DC precision and, thus, the JFET 150 does not dictate DC bias conditions. Instead of grounding the op amp non-inverting input 152, the first op amp 146 suitably drives it and, therefore, the JFET source 160, to a suitable voltage for zero JFET gate voltage. As was indicated, above, the HF photodetector 54' is identical to the HF photodetector 52', as has now been described.

The low pass filter 56', which inputs the signal 116' and outputs the signal 118', includes an op amp 166, resistors 168,170 and capacitor 172. The resistors 168,170 and capacitor 172 are selected to provide a suitable turn-over frequency (e.g., $f_o$=about 100 kHz; a frequency significantly less than the frequency of the light source 44').

The differential amplifier 58', which inputs the signals 112',118' and outputs the signal, z, 122, includes an op amp 174, resistors 176,178,180,182 potentiometer 184 and resistor 186. The potentiometer 184 and resistor 186 set the offset balance of the op amp 174, in order to provide a suitable threshold. A comparator 187 compares the output of the op amp 174 to a suitable threshold and outputs a signal 122'.

The high pass filter 60', which inputs the signal 116' and outputs the signal 120', includes an op amp 188, capacitors 190,192 and resistor 194. The capacitors 190,192 and resistor 194 are selected to provide a suitable turn-over frequency (e.g., $f_o$=about 1.7 MHz; a frequency suitably less than the frequency of the light source 44'). The parallel resistor 196 and capacitor 198 at the op amp output 200 provide a suitable charge source with a suitable time constant for the output signal 120', which is at a high logic level under normal operation of the sensor 130.

The threshold detector 62', which inputs the signal 120' and outputs the signal, R, 124, includes an op amp 202, resistors 204,206,208,210,212 and NPN transistor 214. Under normal operation, the signal 120' is high, the op amp output 216 is low and, thus, the transistor 214 is turned off and the output 124 may be, for example, pulled high by a pull-up resistor (not shown). Under an error condition, the modulated light 64' may be interrupted (e.g., due to a breakage of the POF assembly 45; a component failure). Then, after a suitable time delay, as set by the resistor 196 and capacitor 198, the signal 120' falls below a threshold voltage, as generally set by the resistors 204,206, the op amp output 216 changes state, and, thus, the transistor 214 is turned on, thereby permitting the output error signal, R, 124 to be pulled low.

Figure 4:
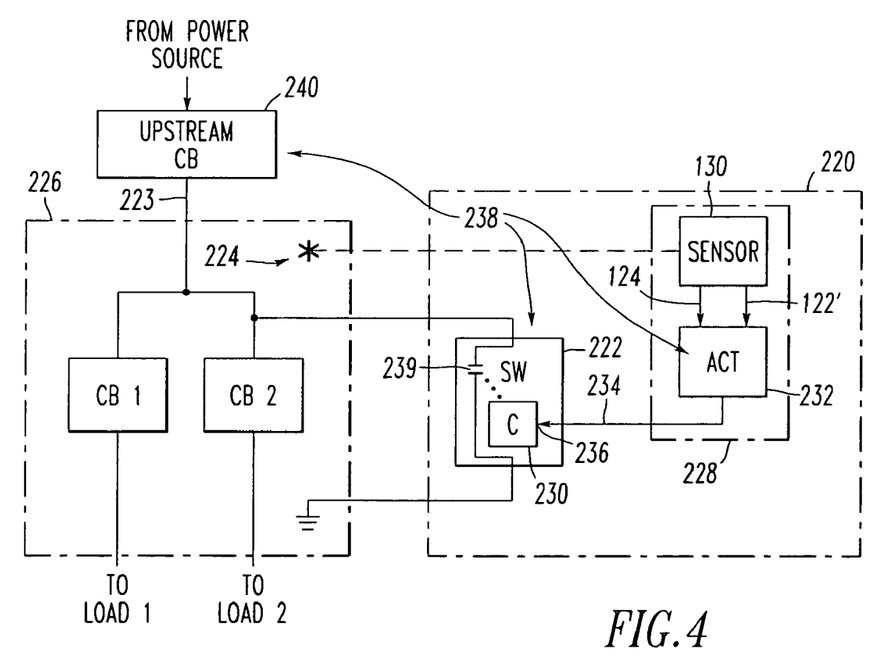
FIG. 4 is a block diagram of a shorting switch system including the arcing fault light sensor of FIG. 2.

FIG. 4 shows a shorting switch system 220 including the arcing fault light sensor 130 of FIGS. 3A and 3B. The system 220 includes one or more shorting switches 222 (only one switch (SW) 222 is shown in FIG. 4). An example of such a shorting switch is disclosed in U.S. Pat No. 6,633,009, which is incorporated by reference herein. Although an example shorting switch 222 is shown, any suitable shorting switch may be employed. The system 220 protects an electric power system power bus 223 from and eliminates arcing faults, such as 224, in low voltage power distribution equipment 226. The system 220 also includes a detection and activation circuit 228 for detecting the arcing fault 224 and responsively activating a shorting switch charge (C) 230, in order that the activated charge 230 results in the elimination of the arcing fault 224 as disclosed in U.S. Pat. No. 6,633,009. As was discussed above in connection with FIG. 3B, the sensor 130 outputs the arcing detection signal 122', which is employed by the activation circuit (ACT) 232 to responsively output an activation signal 234 to the electrical input 236 of the charge 230.

A circuit 238 for removing power from the power bus 223 in response to the arcing signal 122' includes the activation circuit 232, the shorting switch 222, which faults the bus 223 with a shorting member 239 in response to the arcing signal 122' and the activation signal 234, and an upstream circuit breaker (CB) 240, which removes power from the bus 223 in response to detection of overcurrent in the faulted bus.

Under a preferred practice, the activation circuit (ACT) 232 inputs both of the signals 122',124, and actuates the shorting switch 222 when the arcing signal 122' is true and when the error signal 124 is false (e.g., the transistor 214 of FIG. 3B is turned off). In this example, the signals 122',124 may be wire-ORed, in order that when the error signal 124 is true (e.g., the transistor 214 of FIG. 3B is turned on), the arcing signal 122' is pulled low and, thus, is disabled.

Figure 5:
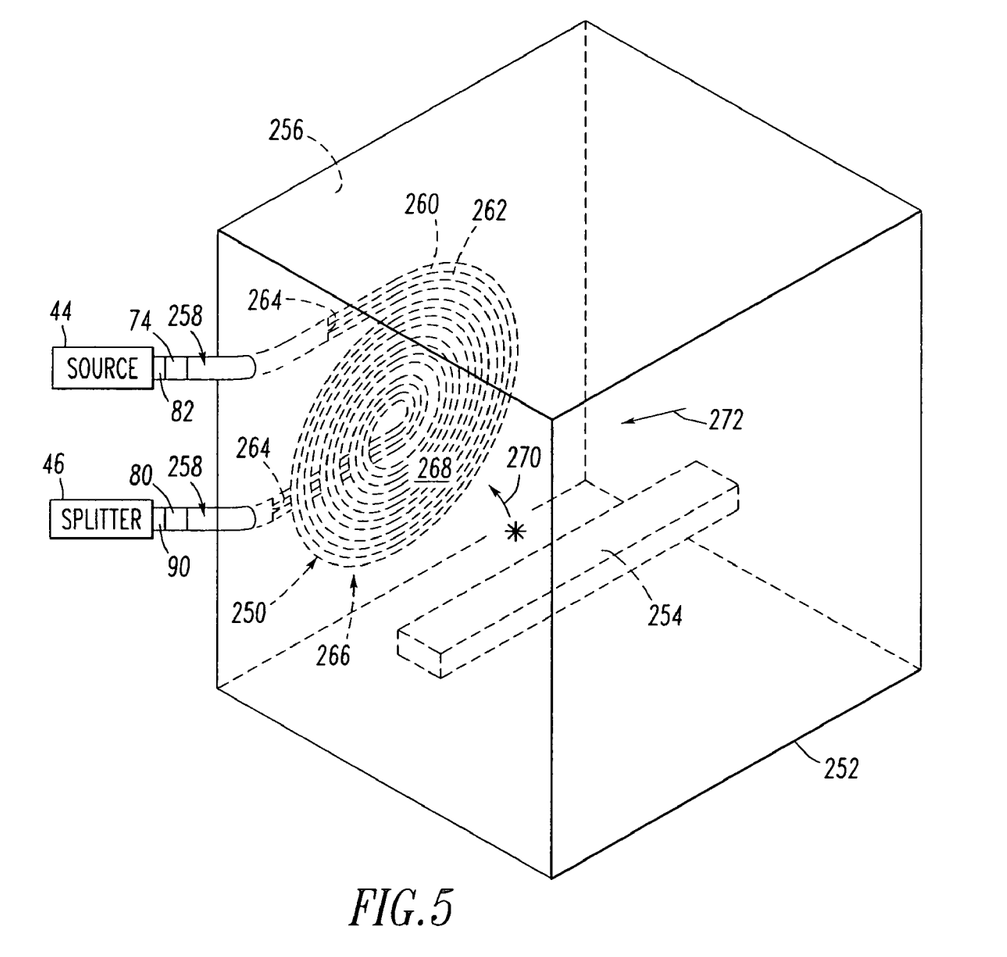
FIG. 5 is an isometric view of an optical fiber arrangement within a switchgear cabinet.

Referring to FIG. 5, an optical fiber "pancake" arrangement 250 is shown with an electric power system enclosure 252 housing a switchgear bus bar 254. The enclosure 252 includes an internal surface 256 facing the switchgear bus bar 254. An optical fiber cable 258, suitable for operation between the light source 44 and the splitter 46 of FIG. 2, includes an outer jacket 260, an inner fiber 262 and an opening 264 in the outer jacket 260 at a gathering portion 266. The optical fiber cable 258 at the gathering portion 266 is formed as a spiral 268 and is suitably fastened (e.g., glued; held in place by a frame (not shown)) to the enclosure surface 256. The outer jacket opening 264 at the gathering portion 266 is opposite the enclosure surface 256 and proximate the switchgear bus bar 254 to receive a portion of the 520 nm arc light 270 and a portion of the ambient light 272.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. Apparatus for detecting an arcing fault at a component of an electric power system, said arcing fault generating light at a first predetermined wavelength in the presence of light at a second wavelength from another source which may include said first predetermined wavelength, said second wavelength being different from said first predetermined wavelength, said apparatus comprising:
   a light source providing modulated light at the second wavelength and at a first frequency;
   an optical fiber including a first end, a gathering portion and a second end, the first end of said optical fiber receiving the modulated light from said light source, the gathering portion being proximate said component and receiving gathered light including some of said light at a first predetermined wavelength and some of said light at a second wavelength from another source, the second end of said optical fiber including said modulated light and said gathered light;
   a splitter receiving said modulated light and said gathered light from the second end of said optical fiber and splitting said modulated light and said gathered light into a first light beam and a second light beam;
   a first filter extracting from said first light beam a first filtered light beam including a first wavelength bandwidth having said first predetermined wavelength;
   a first detector generating a first sensed light electrical signal from said first filtered light beam;
   a second filter extracting from said second light beam a second filtered light beam including a second wavelength bandwidth not having said first predetermined wavelength;
   a second detector generating a second sensed light electrical signal from said second filtered light beam;
   a third filter extracting from said second sensed light electrical signal a third electrical signal representative of said some of said light at a second wavelength from another source and not including said modulated light; and
   means for generating an arcing signal in response to a predetermined relationship between said first sensed light electrical signal and said third electrical signal.

2. The apparatus of claim 1 wherein said means for generating an arcing signal includes a fourth filter and a threshold detector, said fourth filter extracting from said second sensed light electrical signal a fourth electrical signal representative of said modulated light, said threshold detector generating an error signal in response to the fourth electrical signal being below a predetermined threshold value.

3. The apparatus of claim 1 wherein said means for generating an arcing signal includes a comparator comparing said first sensed light electrical signal to said third electrical signal and generating said arcing signal when said first sensed light electrical signal exceeds said third electrical signal by at least a predetermined amount.

4. The apparatus of claim 1 wherein said component of an electric power system is a switchgear bus bar; and wherein said optical fiber is a plastic optical fiber including an outer jacket, an inner fiber, a first connector at the first end, an opening in the outer jacket at the gathering portion and a second connector at the second end, the first connector engaging said light source and receiving the modulated light therefrom, the opening in the outer jacket at the gathering portion being proximate said switchgear bus bar, the second connector engaging the splitter and transmitting said modulated light and said gathered light thereto.

5. The apparatus of claim 1 wherein said second wavelength is about 820 nm; and wherein said first frequency is about 2 MHz.

6. The apparatus of claim 1 wherein said splitter is an optical splitter which splits said modulated light and said gathered light into the first light beam having a first intensity and the second light beam having a second intensity, with said first intensity being about equal to said second intensity.

7. The apparatus of claim 1 wherein said first wavelength is about 520 nm; and wherein said first filter is an optical filter including a first bandwidth of wavelengths, said first bandwidth including 520 nm.

8. The apparatus of claim 1 wherein said second wavelength is about 820 nm; and wherein said second filter is an optical filter including a second bandwidth of wavelengths, said second bandwidth including 820 nm.

9. The apparatus of claim 1 wherein said component of an electric power system includes an enclosure housing a switchgear bus bar, said enclosure including a surface facing said switchgear bus bar; wherein said optical fiber includes an outer jacket, an inner fiber and an opening in the outer jacket at the gathering portion; wherein said optical fiber at the gathering portion is formed as a spiral and is fastened to the surface of said enclosure; and wherein the opening in the outer jacket at the gathering portion is opposite said surface and proximate said switchgear bus bar to receive said some of said light at a first predetermined wavelength and said some of said light from another source.

10. A method of detecting an arcing fault at a component of an electric power system, said arcing fault generating light at a first predetermined wavelength in the presence of light at a second wavelength from another source which may include said first predetermined wavelength, said second wavelength being different from said first predetermined wavelength, said method comprising:
   providing modulated light at the second wavelength and at a first frequency;
   employing an optical fiber including a first end, a gathering portion and a second end;
   receiving the modulated light at the first end of said optical fiber;
   disposing the gathering portion of said optical fiber proximate said component to receive gathered light including some of said light at a first predetermined wavelength and some of said light at a second wavelength from another source;
   receiving said modulated light and said gathered light from the second end of said optical fiber and splitting said modulated light and said gathered light into a first light beam and a second light beam;
   extracting from said first light beam a first filtered light beam including a first wavelength bandwidth having said first predetermined wavelength;
   generating a first sensed light electrical signal from said first filtered light beam;
   extracting from said second light beam a second filtered light beam including a second wavelength bandwidth not having said first predetermined wavelength;
   generating a second sensed light electrical signal from said second filtered light beam;
   extracting from said second sensed light electrical signal a third electrical signal representative of said some of said light at the second wavelength from another source and not including said modulated light; and generating an arcing signal in response to a predetermined relationship between said first sensed light electrical signal and said third electrical signal.

11. The method of claim 10 further comprising
comparing said first sensed light electrical signal to said third electrical signal; and
generating said arcing signal when said first sensed light electrical signal exceeds said third electrical signal by at least a predetermined amount.

12. The method of claim 10 further comprising
extracting from said second sensed light electrical signal a fourth electrical signal representative of said modulated light; and
generating an error signal in response to the fourth electrical signal being below a predetermined threshold value.

13. The method of claim 12 further comprising
employing a low pass filter having a first turn-over frequency, which is less than said first frequency, to extract from said second sensed light electrical signal said third electrical signal representative of said some of said light at the second wavelength from another source and not including said modulated light at said first frequency; and
employing a high pass filter having a second turn-over frequency, which is greater than said first turn-over frequency and which is less than said first frequency, to extract from said second sensed light electrical signal said fourth electrical signal representative of said modulated light at said first frequency.

14. The method of claim 10 further comprising
employing about 520 nm as said first predetermined wavelength;
employing about 820 nm as said second wavelength.

15. Apparatus for protecting a bus of an electric power system from an arcing fault, which generates light at a first predetermined wavelength in the presence of light at a second wavelength from another source which may include said first predetermined wavelength, said second wavelength being different from said first predetermined wavelength, said apparatus comprising:
a light source providing modulated light at the second wavelength and at a first frequency;
an optical fiber including a first end, a gathering portion and a second end, the first end of said optical fiber receiving the modulated light from said light source, the gathering portion being proximate said component and receiving gathered light including some of said light at a first predetermined wavelength and some of said light at a second wavelength from another source, the second end of said optical fiber including said modulated light and said gathered light;
a splitter receiving said modulated light and said gathered light from the second end of said optical fiber and splitting said modulated light and said gathered light into a first light beam and a second light beam;
a first filter extracting from said first light beam a first filtered light beam including a first wavelength bandwidth having said first predetermined wavelength;
a first detector generating a first sensed light electrical signal from said first filtered light beam;
a second filter extracting from said second light beam a second filtered light beam including a second wavelength bandwidth not having said first predetermined wavelength;
a second detector generating a second sensed light electrical signal from said second filtered light beam;
a third filter extracting from said second sensed light electrical signal a third electrical signal representative of said some of said light at a second wavelength from another source and not including said modulated light;
means for generating an arcing signal in response to a predetermined relationship between said first sensed light electrical signal and said third electrical signal; and
means for removing power from said bus in response to said arcing signal.

16. The apparatus of claim 15 wherein said means for removing power from said bus in response to said arcing signal includes a shorting switch, which faults said bus in response to said arcing signal, and an upstream circuit breaker, which removes power from said bus in response to detection of overcurrent in said faulted bus.

17. The apparatus of claim 16 wherein said means for generating an arcing signal includes a fourth filter and a threshold detector, said fourth filter extracting from said second sensed light electrical signal a fourth electrical signal representative of said modulated light, said threshold detector generating an error signal in response to the fourth electrical signal being below a predetermined threshold value.

18. The apparatus of claim 16 wherein said shorting switch includes a shorting member; and wherein said means for removing power includes a control circuit, which inputs said arcing signal and said error signal, said control circuit actuating said shorting member when said arcing signal is true and when said error signal is false.

19. The apparatus of claim 15 wherein said optical fiber includes an outer jacket, an inner fiber, a first connector at the first end, an opening in the outer jacket at the gathering portion and a second connector at the second end, the first connector engaging said light source and receiving the modulated light therefrom, the opening in the outer jacket at the gathering portion being proximate said bus, the second connector engaging the splitter and transmitting said modulated light and said gathered light thereto.

20. The apparatus of claim 15 wherein said bus is housed within an enclosure including a surface facing said bus; wherein said optical fiber includes an outer jacket, an inner fiber and an opening in the outer jacket at the gathering portion; wherein said optical fiber at the gathering portion is formed as a spiral and is fastened to the surface of said enclosure; and wherein the opening in the outer jacket at the gathering portion is opposite said surface and proximate said bus to receive said some of said light at a first predetermined wavelength and said some of said light from another source.

* * * * *